United States Patent
Kratzer

(10) Patent No.: US 6,184,820 B1
(45) Date of Patent: Feb. 6, 2001

(54) COHERENT PULSE RADAR SYSTEM

(75) Inventor: Dale Leonard Kratzer, Medford Lakes, NJ (US)

(73) Assignee: Lockheed Martin Corp., Moorestown, NJ (US)

( * ) Notice: Under 35 U.S.C. 154(b), the term of this patent shall be extended for 0 days.

(21) Appl. No.: 06/676,104

(22) Filed: Nov. 29, 1984

(51) Int. Cl.$^7$ .................................................. G01S 13/534
(52) U.S. Cl. ............................................. 342/160; 342/162
(58) Field of Search .................................. 342/160, 163, 342/131, 149, 62, 194, 21, 115, 116, 132, 134, 135, 159, 162, 192, 193, 195, 201, 202, 203

(56) References Cited

U.S. PATENT DOCUMENTS

| | | | |
|---|---|---|---|
| 3,263,227 | 7/1966 | Ferry et al. | 342/801 |
| 3,267,467 | 8/1966 | Gerardin et al. | 342/160 |
| 3,725,926 | 4/1973 | Area | 342/163 |
| 4,047,171 | * 9/1977 | Fugit | 342/131 X |
| 4,155,088 | 5/1979 | Taylor, Jr. et al. | 342/131 |
| 4,375,641 | * 3/1983 | Joseffson et al. | 342/131 X |
| 4,485,384 | 11/1984 | Connor | 342/405 |
| 4,486,756 | 12/1984 | Peregrim et al. | 342/149 |
| 4,495,501 | * 1/1985 | Creed | 342/160 |
| 4,586,044 | * 4/1986 | Hopwood et al. | 342/160 X |
| 4,616,228 | * 10/1986 | Giaccari et al. | 342/160 |
| 4,644,356 | * 2/1987 | Yamano | 342/160 |
| 5,347,281 | * 9/1994 | Lewis et al. | 342/160 |
| 5,371,504 | * 12/1994 | Lewis | 342/114 |
| 5,422,646 | * 6/1995 | Lewis | 342/160 |
| 5,463,399 | * 10/1995 | Kretschmer, Jr. | 342/132 |
| 5,530,448 | * 6/1996 | Lewis | 342/132 |
| 5,870,054 | * 2/1999 | Lewis | 342/163 |

\* cited by examiner

*Primary Examiner*—John B. Sotomayor
(74) *Attorney, Agent, or Firm*—W. H. Meise; S. D. Weinstein

(57) ABSTRACT

A coherent, frequency agile pulse radar system in which each transmitted pulse is made up of subpulse pairs having frequencies of $\omega_o \pm \Delta_i$ forces a jammer to broadband jam the system in order to ensure jamming the actual operating frequency of the system. On reception, a separate receiver channel is utilized for the detection of each subpulse frequency. Within the processing system, the signal return for a subpulse having a frequency of $\omega_o + \Delta_I$ is multipled times the signal return for the subpulse having a frequency of $\omega_o - \Delta_I$ to provide a combined signal which is free of the offset frequencies. This combined signal is a standard coherent frequency agile pulse doppler radar signal with the exception that the carrier frequency and the doppler frequency are both doubled. Moving target indicating or doppler processing may be used. N-time-around range ambiguities can be eliminated and sensitivity time control can be used to remove close-in clutter without limiting the pulse repetition rate.

16 Claims, 4 Drawing Sheets

COHERENT PULSE RADAR SYSTEM

BACKGROUND OF THE INVENTION

This invention relates to pulse radars and more particularly to pulse doppler and moving target indicating radars.

Doppler and moving target indicating (MTI) radars are used to detect targets in locations where return signals have a large clutter or noise content which interferes with determining the presence of a target using conventional radar signal processing techniques. Doppler radars can be capable of detecting moving targets under conditions in which conventional MTI processing is ineffective. Conventional MTI radar subtracts the received return signal from one pulse from the return signal for the next pulse as a means of removing the return signals from stationary objects (clutter) to leave only the returns from moving targets. Doppler radar relies on the frequency shift in the return signal which is produced by the velocity of a target which reflects the transmitted radar signal. In general, the objects which reflect the clutter components of the return signals are stationary or moving very slowly. As a consequence, clutter return signals are essentially at the same frequency as the transmitted radar signal. Where the target being searched for or tracked is a relatively high speed target, a sufficient doppler frequency shift occurs in the signals reflected from that target to enable them to be separated from the clutter signals by narrow band filtering.

As a consequence of these characteristics doppler radar has become of increasing interest with the development of high speed aircraft which are capable of flying close to the ground. Such an aircraft may escape detection by conventional radar and MTI radar because clutter signals reflected from the ground, vegetation or the surface of the sea may be strong enough to interfere with the detection of the signals returned from the aircraft. These problems are greatly reduced through the use of doppler radar. However, as with all radars, doppler radars are subject to electronic counter measures (ECM) techniques such as jamming and signal repetition and must contend with noise. One technique which can be used to reduce the problem of close-in clutter is sensitivity time control (STC) in the receiver. With STC, the sensitivity of the receiver is kept low after the transmission of a pulse until returns from close-in clutter have been received and then the sensitivity is increased to receive returns from more distant objects which are of interest. This prevents overloading both the receiver and signal processing system with close-in clutter returns which are of no interest.

One limitation on radar immunity to ECM which is encountered with both MTI and doppler radars is the N-time-around problem. The N-time-around problem is created when additional radar pulses are transmitted before returns from distant targets are received from a first pulse. Under these conditions returns from distant targets illuminated by earlier transmitted pulses are received intermixed with returns from nearer targets illuminated by subsequent pulses. This produces several problems. One is ambiguity as to the range of a target since any given return may be from as many different ranges as there are transmitted pulses from which returns can currently be received. Another is that STC can not be used to reduce close-in clutter returns without also reducing sensitivity to target returns from earlier transmitted pulses. An ECM problem arises because of the possibility of a jammer receiving a transmitted pulse and repeating it in a manner to create spurious targets and/or mask targets by narrow band jamming at the transmitted frequency.

A means is needed of minimizing the vulnerability of a doppler or MTI radar to ECM. One way of accomplishing this is transmitting a signal which forces a jammer to jam a wide frequency band rather than just the very narrow frequency band in which the radar is actually operating. This requires transmission of a signal which prevents the jammer from merely retransmitting the signal as a means of jamming the radar receiver. Forcing a jammer to jam a wide frequency range can result in a 18 dB reduction in jammer power at the frequency the radar is actually operating at when the jammer jams a frequency band which is 69 MHz wide and the radar is only utilizing a 1 MHz bandwidth. Another technique is to use frequency agility to rapidly change the transmitted frequency as a means of reducing the effectiveness of signal repetition ECM techniques.

It is desirable to provide a radar which provides the benefits of MTI or doppler processing while ensuring that narrow band jamming and signal repetition will be ineffective ECM techniques while enabling the use of STC clutter reduction techniques and eliminating the N-time-around problem.

SUMMARY

The present invention provides such a radar in which a transmission pulse is comprised of N pairs of subpulses. The two subpulses of a pair have frequencies of $\omega_o+\Delta_i$ and $\omega_o-\Delta_i$, where $\omega_o$ is the carrier frequency and $+\Delta_i$ and $-\Delta_i$ are equal and opposite frequency offsets from the carrier frequency. The receiving and processing system employs a separate channel for each of the subpulse frequencies. At baseband the two signals of a given subpulse pair (offsets of $\pm\Delta_i$) are multiplied together to produce a signal which is free of the frequency offsets and which can be processed in accordance with normal coherent doppler or MTI processing. By switching frequencies from pulse to pulse without repeating a frequency while an earlier pulse at that frequency is still active this radar can eliminate N-time-around range ambiguities and enable the use of STC close-in clutter reduction techniques.

DETAILED DESCRIPTION

Figure 1:
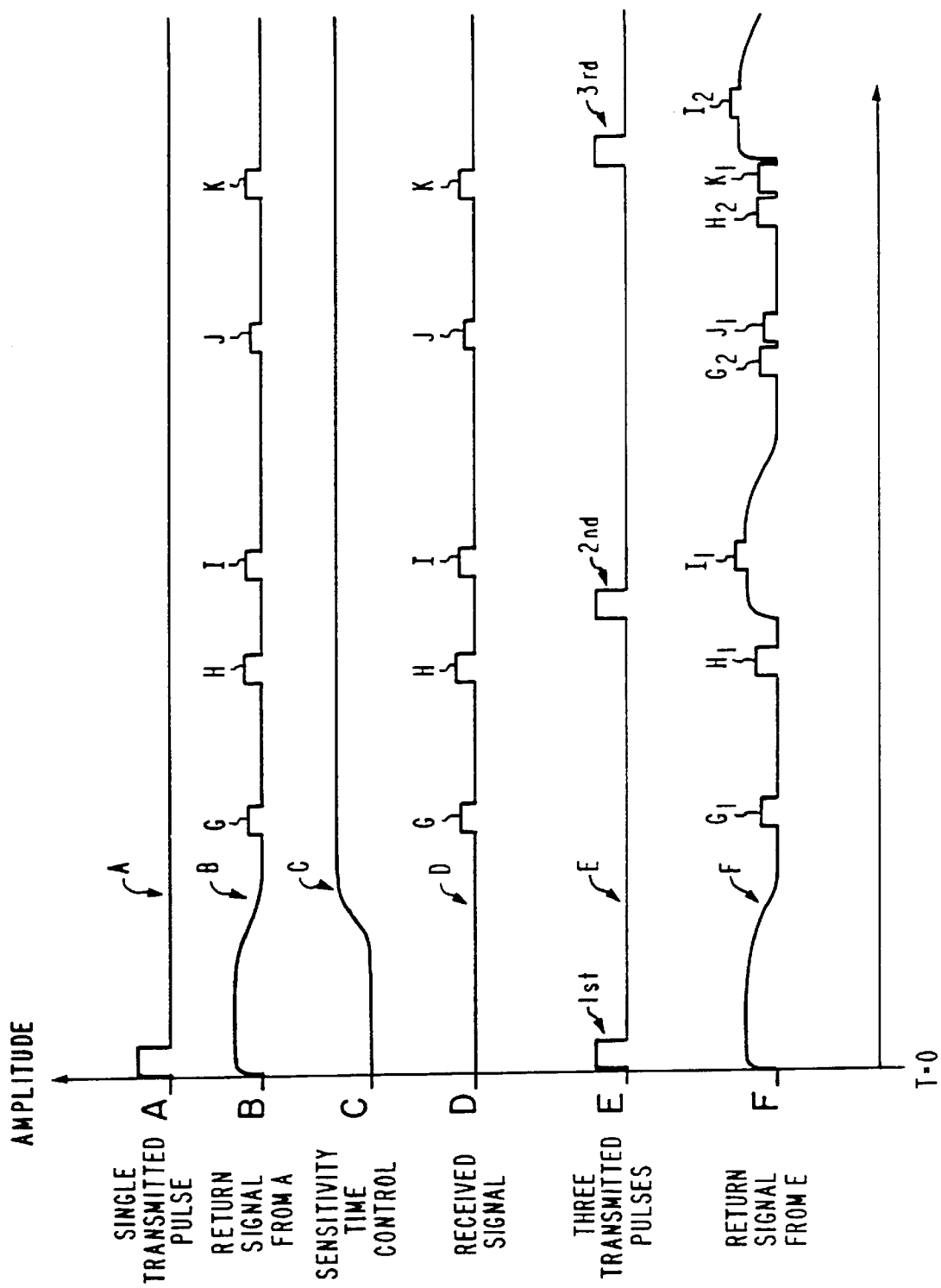
FIG. 1 illustrates in graphic form some characteristics of radar signals.

In FIG. 1 the curve A illustrates a single transmitted pulse. Curve B illustrates the strength of the return signal from that pulse as a function of time. The early part of this return signal is intense due to reflections from close-in clutter. The later portion of this return signal contains returns from distant clutter and targets (G–K) which are of differing, usually lower intensities. Curve C illustrates the gain of the receiver as a function of time when STC (sensitivity time control) techniques are used to suppress close-in clutter. Curve D illustrates the receiver output signal in which the close-in clutter signals are not present which results from use of STC. Curve E illustrates a series of transmitted pulses in which first, second and third pulses are active at one time. Curve F illustrates the resulting return signal in which clutter can not be reduced using STC without also reducing returns from targets of interest and in which N-time-around range ambiguities are present because of the intermixing of returns from different ones of the transmitted pulses. The returns $G_I$, $H_I$, $I_I$, $J_I$ and $K_I$ are from the first pulse while the returns $G_2$, $H_2$, $I_2$ are from the second pulse. The returns $I_I$ and $I_2$ are buried in the clutter returns from the second and third transmitted pulses, respectively, and would be eliminated if STC techniques were in use.

Figure 2:
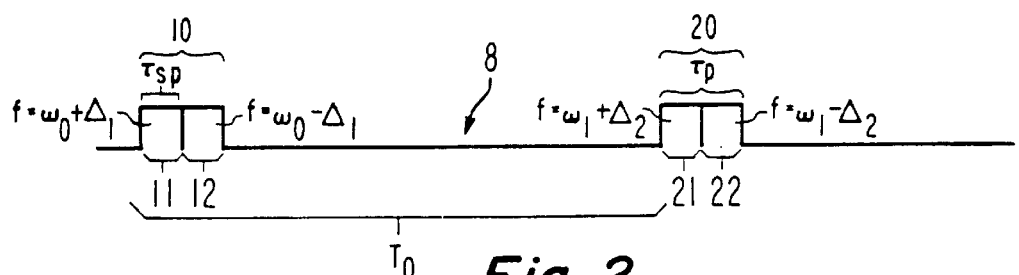
FIG. 2 illustrates a transmission pulse signal in accordance with the present invention which comprises a single subpulse pair per pulse.

A transmission signal 8 in accordance with the present invention is represented by the waveform in FIG. 2. First and second transmitted pulses 10 and 20 are illustrated. The first pulse 10 comprises a first subpulse 11 having a frequency of $\omega_o+\Delta_I$ and a second associated subpulse 12 having a frequency $\omega_o-\Delta_I$, where $\omega_o$ represents the carrier frequency for the pulse and $\Delta_I$ represents a frequency offset (modulation) from that carrier frequency. The square wave shape of each subpulse 11 and 12 in pulse 10 is the envelope of the transmitted subpulse. Each subpulse comprises many cycles at its frequency ($\omega_o+\Delta_I$ for subpulse 11 and $\omega_o-\Delta_I$ for subpulse 12). The modulation (frequency in this example) is different in adjacent subpulses and the boundary between the subpulses 11 and 12 is the location within the pulse 10 at which the modulation (frequency) changes. The subpulses 11 and 12 are associated as a pair because they have equal and opposite offsets ($+\Delta_I$ and $-\Delta_I$) from the carrier frequency $\omega_o$.

Each subpulse has a duration $\tau_{sp}$ and each pulse has a duration $\tau_p$. In FIG. 2 $\tau_p=2\ \tau_{sp}$. The beginning of the second pulse 20 is spaced from the beginning of the first pulse by the pulse repetition interval $T_o$. The second pulse 20 is similar to the first pulse 10 except that the first subpulse 21 of pulse 20 has a frequency of $\omega_I+\Delta_2$ and the second subpulse 22 of pulse 20 has a frequency of $\omega_I-\Delta_2$, where $\omega_I$ represents a different carrier frequency and $\Delta_2$ represents the frequency offset modulated on that carrier. In the preferred embodiment $\Delta_2$ is different from $\Delta_I$. In any case, the frequencies are preferably arranged so no common frequency exists between the first pulse 10 nd the second pulse 20. This prevents a jammer from receiving the first pulse, determining its frequency and then jamming a narrow frequency band around that first pulse frequency in order to prevent the radar system from receiving return signals from the second pulse. Further, the duration of each subpulse 11 or 12 in the first pulse is short enough that a jammer is unable to react to it in time to rebroadcast a signal capable of interfering with the radar reception of reflected signals from the jammer itself and any target closer to the radar than the jammer. This transmitted pulse sequence also allows sensitivity time control (STC) techniques to be used if receivers with separate gain controls are used to process the return signals from the different transmitted pulses. The N-time-around problem is eliminated because the frequency of the return signal indicates which transmitted pulse produced a given target return pulse. If desired, $\omega_I$ may be the same as $\omega_o$. However, that is not preferred in order that a jammer will be forced to spread its jamming energy over a wider spectrum.

On reception, the return signal received by the antenna is down converted from the radar frequency to the IF frequency and then provided to a multi-channel receiver having a separate channel for each subpulse frequency. Two receiver channels are required for each pulse in the waveform 8 which consists of two subpulses per pulse. If P of these pulses are active at a time, then 2P separate receiver channels are needed. The signal from each channel is I and Q detected at baseband, to provide a complex value for the return signal at that subpulse frequency. The I component is the real part of the complex value and the Q component is the imaginary part of the complex value. In state of the art implementations of coherent pulse doppler radar systems these I and Q components are converted to digital values in analog-to-digital converters (ADCs). Thereafter, all subsequent processing is done digitally on a series of digital samples. The complex value of the return signal sample can be expressed as $I+_iQ$ where I is the value of the sample of the in-phase component of the return signal, Q is the value of the sample of the quadrature component of the return signal and i is the $\sqrt{-1}$, or as $Ae^{i\phi}$ where $A=\sqrt{I^2+Q^2}$ and $\phi=\tan^{-1}Q/I$. The term A is the amplitude of this complex value and the term $I\phi$ is the phase of this complex value. The return signal value at baseband from the higher frequency subpulse of the first associated pair for a given sample is $S_H=A_H e^{i(\omega_o+\Delta_I)t}$ and the return signal at baseband from the lower frequency subpulse of that associated pair for the same sampling time is $S_L=A_L e^{i(\omega_o-\Delta_I)t}$; assuming $\Delta_I$ is positive. The return signal ($S_H$) from the first transmitted subpulse is delayed by the subpulse duration $\tau_{sp}$ to be coincident with the second transmitted subpulse ($S_L$). This delay can be provided prior to analog-to-digital conversion or subsequent to analog-to-digital conversion if the sampling period is $\tau_{sp}/A$, where A is an integer greater than or equal to one. These two signal values are multiplied together to yield the signal value:

$$S_K 32\ S_H S_L = A_H A_L e^{i[(\omega_o+\Delta_I)+(\omega_o-\Delta_I)]t} = A_H A_L e^{i2\omega_o t} = A e^{i2\omega_o t}.$$

Normalizing this result by dividing by its magnitude yields a signal value $$\frac{S_H S_L}{S_H S_L} = e^{i2\omega_o t}.$$

The sample $S_K=Ae^{i2\omega_o t}$ is a standard non-normalized doppler sample except for the presence of the "2" in the exponent. K is an index indicating the number of the sample in a series of samples. In a similar manner the sample $S_K/|S_K|=e^{i2\omega_o t}$ is a standard normalized doppler sample except for the presence of the "2" in the exponent. Thus, the only difference between these signals and normal doppler signals is that the target phase equivalent (the coefficient of t in the exponent of e) is double the carrier frequency (2 $\omega_o$) rather than the carrier frequency ($\omega_o$). It will be noted that nothing remains of the frequency offsets $\pm\Delta_I$ of the two subpulses from the carrier frequency. These signals are also useful for multiple pulse MTI processing. If we now substitute the carrier frequency plus the doppler frequency for the carrier frequency itself in these return signals, we find that the apparent doppler frequency after processing is also doubled. This comes about due to the multiplication which eliminated the $\pm\Delta$ frequency offsets. With this basic description of the desired operation of the system as background, several more complex waveforms in accordance with the present invention will be briefly described followed by a description of an overall system for transmitting, receiving and processing such waveforms.

Figure 3:
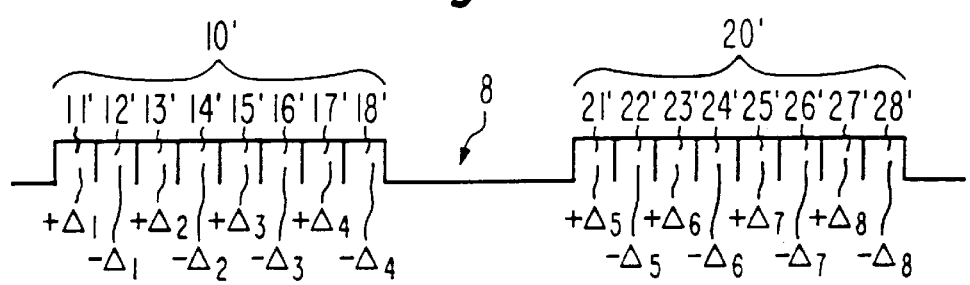
FIG. 3 illustrates a transmission pulse signal in accordance with the present invention comprising four subpulse pairs per pulse.

In FIG. 3, a transmission signal 8' is illustrated which is like the signal 8 except that each of the pulses comprises eight subpulses rather than two and $\tau_p=8\tau_{sp}$. In signal 8' the first subpulse 11' has an offset from the carrier frequency of $+\Delta_1$, and the second subpulse 12' has an offset of $-\Delta_1$. These two subpulses comprise a first associated pair for processing because their frequency offsets from $\omega_0$ are $+\Delta_1$ and $-\Delta_1$. The third subpulse 13' (the first subpulse of the second associated pair of subpulses) has an offset of $+\Delta_2$ while the fourth subpulse 14' (the second subpulse of that second pair of subpulses) has an offset of $-\Delta_2$. In a similar fashion, the offsets of the subpulses 15', 16', 17' and 18' are respectively $+\Delta_3$, $-\Delta_3$, $+\Delta_4$ and $-\Delta_4$. In a similar fashion, the second pulse 20' comprises eight subpulses 21'–28' which have frequency offsets of $\pm\Delta_5$, $\pm\Delta_6$, $\pm\Delta_7$ and $\pm\Delta_8$ from the carrier frequency $\omega$. The processing of the return signal from this transmitted signal is similar to the processing of the return signal from the transmitted signal 8, except for the need for eight receiver channels rather than two in order to process each of the subpulses present in a given transmitted pulse. If P of these pulses are active at a time, then 8P separate receiver channels are needed to process the return signals from this transmitted signal. The pulse configuration of signal 8' has the advantage over the signal 8 of providing greater transmitted and received energy and greater correlation of the desired signal thereby improving the signal detectability above noise and clutter.

Figure 4:
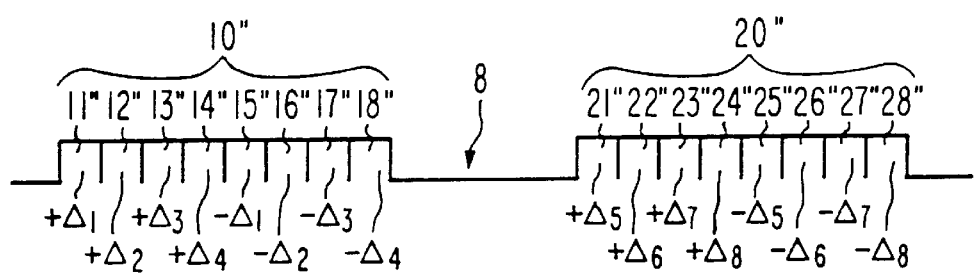
FIG. 4 illustrates a modified version of the FIG. 3 signal in which the two subpulses which form a pair are spaced from each other by at least one other subpulse.

In FIG. 4, a third transmission signal 8" comprises pulses 10" and 20" each containing eight subpulses as in the signal 8'. However, in signal 8", the two subpulses which form an associated pair for processing (i.e., whose baseband samples are multiplied together to eliminate their frequency offsets) are not adjacent in time as they are in the signal 8'. Thus, the subpulses 11", 12", 13", 14", 15", 16", 17", and 18" have frequency offsets of $+\Delta_1$, $+\Delta_2$, $+\Delta_3$, $+\Delta_4$, $-\Delta_1$, $-\Delta_2$, $-\Delta_3$ and $-\Delta_4$, respectively. The pulse 20" is formed in a similar fashion with its subpulses 21"–28" having offsets of $+\Delta_5$, $+\Delta_6$, $+\Delta_7$, $+\Delta_8$, $-\Delta_5$, $-\Delta_6$, $-\Delta_7$ and $-\Delta_8$, respectively. The return signals from the signal 8" may be processed in a system similar to that used for the signal 8' with the exception of a modification to compensate for the longer time between the occurrence of the first and second subpulses of a pair in signal 8" as compared to signal 8'. This configuration requires a delay of the return signal from the subpulse $+\Delta_1$ for example by $4\tau_{sp}$ so that it coincides with the return signal from the subpulse $-\Delta_1$.

Figure 5:
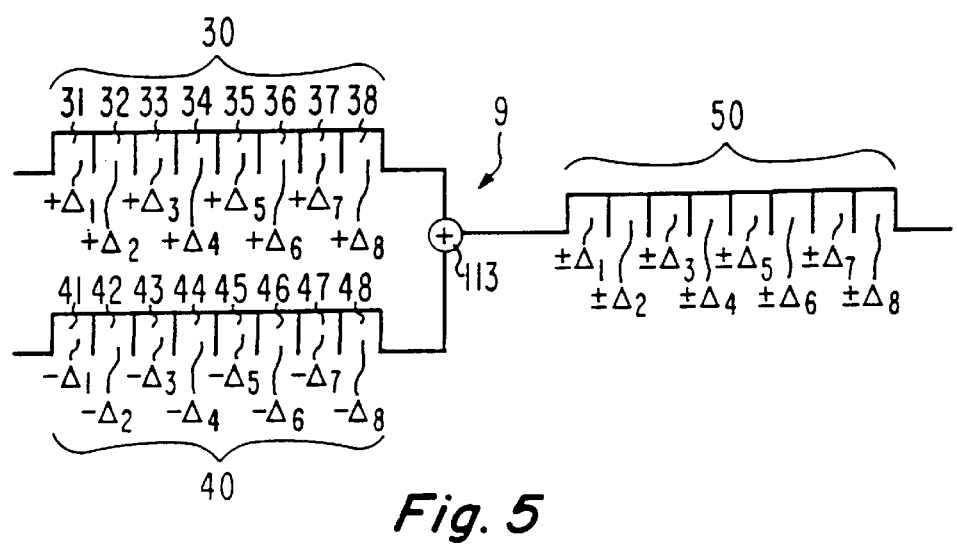
FIG. 5 illustrates the formation of another alternative transmission signal in accordance with the present invention in which two subpulses are transmitted simultaneously.

In FIG. 5, the generation of a transmission signal 9 is illustrated schematically. A first pulse 30 containing eight subpulses 31–38 having offset frequencies of $+\Delta_1$, $+\Delta_2$, $+\Delta_3$, $+\Delta_4$, $+\Delta_5$, $+\Delta_7$ and $+\Delta_8$ is generated. At the same time, a second pulse 40 having eight subpulses 41–48 having frequency offsets of $-\Delta_1$, $-\Delta_2$, $-\Delta_3$, $-\Delta_4$, $-\Delta_5$, $-\Delta_6$, $-\Delta_7$ and $-\Delta_8$ is generated. These two pulses are then combined in a combiner 113 to form the first actual transmitted pulse 50 of signal 9 which appears similar to a double sideband, suppressed carrier, signal in which the offset from the carrier frequency takes on the values $\pm\Delta_1$, $\pm\Delta_2$, $\pm\Delta_3$, $\pm\Delta_4$ $\pm\Delta_5$, $\pm\Delta_7$, and $\pm\Delta_8$. The returned signals from this transmitted signal 9 may be processed in a system similar to that used to process the signal 8' with the change that the two subpulses of the same magnitude of frequency offset from the carrier will arrive simultaneously rather than spaced by the subpulse width $\tau_{sp}$ and thus no delay of one subpulse of a pair will be required. Sixteen channels will be required to process one return pulse of this type and 16 P channels will be required for P active pulses.

The number of different subpulses in a transmitted pulse is limited by the bandwidth of the antenna system, the number of receiving channels available to process the return signals and by a desire to retain the transmitted pulse overall duration $\tau_p$ at a short enough value that the highest speed target anticipated will not accomplish substantial manuvers during the reflection of a single pulse.

Figure 6:
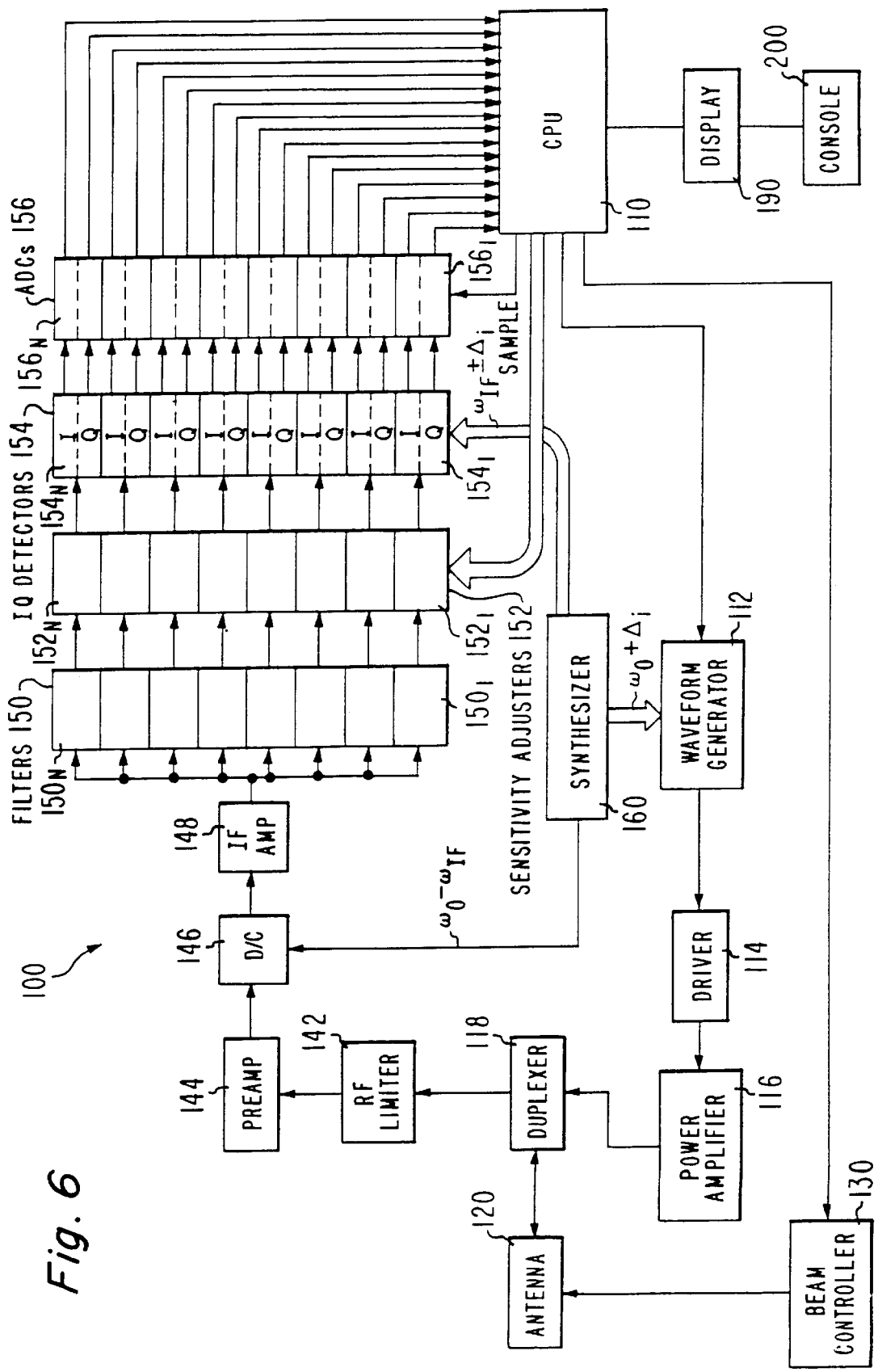
FIG. 6 illustrates in block diagram form a coherent frequency agile pulse radar system in accordance with the present invention.

A more detailed discussion of the overall coherent pulse doppler radar system required for production and useful reception of the inventive signal makes reference to the block diagram 100 in FIG. 6. This system comprises a central processing unit (CPU) 110 which does the signal processing on the received signals and controls the overall operation of the system including the operation of a waveform generator 112 which receives from a frequency synthesizer 160 the subpulse frequencies $\omega_o \pm \Delta_i$ to be transmitted . The frequency synthesizer 160 is of the type which provides a large number of frequencies on a continuous basis. The selection of which frequencies to use in generating a given pulse results in the use of some but not all of the available frequencies in any one pulse. This synthesizer maintains coherency of its output signals such that the returned waveforms can be coherently processed with respect to the transmission phase of each subpulse frequency. Waveform generator 112 provides the resulting transmission signal to a driver amplifier 114 which, in turn, provides an amplified transmission signal to a power amplifier 116 from which the signal passes to a duplexer 118 for transmission to the antenna 120 for radiation into the ambient environment. The CPU 110 also controls the operation of the beam steering controller 130 which controls the antenna to cause the radiated beam to have a desired beam axis. A received signal arrives through the antenna 120, passes through the duplexer 118 and from there to an RF limiter 142. RF limiter 142 limits signal amplitudes to values which are non-destructive to subsequent circuitry. From the RF limiter 142 the received signal passes to a preamplifier 144 and then to a down conversion system 146 to convert the received signal from the radar frequency to an IF frequency. The local oscillator frequency provided to the down converter system 146 by synthesizer 160 is $\omega_o - \omega_{IF}$, which is selected to convert all frequencies of interest to within the bandwidth of the IF system. The bandwidth of the IF frequencies passed by amplifier 148 is wide enough to enable the use of a large number of different subpulse frequencies. A bandwidth on the order of 320 MHz at a center frequency of about 600 MHz is appropriate for use with thirty-two different subpulse frequencies spaced 10 MHz apart.

From the IF amplifier 148, the received signal passes to a bank 150 of filters $150_1$, $150_2$, $150_3$ . . . $150_N$, where N is the total number of subpulse frequencies available for use in the system. Each of the filters in the bank 150 is of a type which retains the phase of the signal within its pass band without distorting that phase. Bessel and Butterworth filters are examples of this type of filter. Where the available subpulse frequencies are spaced 10 MHz apart, these filters preferably have bandwidths of 10 MHz, each centered at a subpulse frequency. If desired, the number of filters 150 can be reduced to the number of subpulse frequencies in use at one time and the filters may be frequency switched. However, such construction is not preferred because of a resulting increase in system complexity.

From the filter bank 150, the output of each filter passes to a corresponding sensitivity adjuster $152_1$, $152_2$, . . . $152_N$ in a bank 152 of sensitivity adjusters. These sensitivity adjusters which provide the STC or sensitivity time control may be amplifiers or attenuators as may be considered desirable. Each of the sensitivity adjusters $152_i$ operates under the control of CPU 110 in timed relation to the transmission of a subpulse having the center frequency of that sensitivity adjuster's associated filter $150_i$. The subscript "i" takes on any of the subscript values from one to N in accordance with which receiver channel is being considered. The transmission of signals through a given sensitivity adjuster is reduced or suppressed during the period of close-in clutter returns for that frequency and then is preferably increased in a ramped manner to a desired maximum transmission level. This sensitivity time control only affects subpulse frequencies which have just been transmitted. Thus, it does not reduce the sensitivity of channels which are still receiving distant returns from earlier transmitted subpulse frequencies and those channels are not effected by the close-in clutter at the new subpulse frequencies since this close-in clutter is outside the passbands of their filters $150_i$.

From the individual sensitivity adjusters $152_i$, each signal is passed to an associated IQ detector $154_i$ which receives as its local oscillator signal $\omega_{IF} \pm \Delta_i$ from synthesizer 160, where the value of $\omega_{IF} \pm \Delta_i$ is the subpulse frequency (at IF) about which the passband of its associated filter $150_i$. is centered. Either two orthogonal signals of this frequency are received from the synthesizer or a second orthogonal one is generated internally of the IQ detector. Each of the IQ detectors 154 provides two outputs—an I component and a Q component. These components pass to a corresponding pair of analog-to-digital converters (ADC) 156—one for the I component and one for the Q component.

Digital signals emerge from the ADCs 156 at a predetermined rate controlled by CPU 110. At this point, all data is now in digital form. The use of STC enables the approximately 60dB dynamic range of the ADCs to be reserved for return target signal dynamics rather than being partially consumed by close-in clutter return signals.

The complex digital value of a given sample of the first subpulse of an associated pair of subpulses is multiplied within CPU 110 by the complex digital value of a corresponding sample of the second subpulse of that associated pair. These corresponding samples are for the same elapsed time between their transmission and their receipt. The result of this multiplication is the signal sampler $$\frac{S_H S_L}{|S_H S_L|} = e^{i2\omega_Q t}$$

which is a standard normalized doppler signal sample except for the presence of the "2" in its exponent as has been described.

Which particular subpulse frequencies comprise an associated pair depends on the carrier frequency $\omega_o$ and thus will change if the carrier frequency is changed. For this reason, the pairing of subpulse frequencies within CPU 110 is preferably made controllable rather than fixed. The pairing of subpulse frequencies is preferably changed during the period when the signals at the new subpulse frequencies are suppressed by the STC system.

Within the CPU 110, a standard coherent pulse doppler processor in accordance with the prior art then processes the individual signal samples for the combined subpulse pairs as though they were normal doppler signals. The only difference from the prior art is that the "doppler" frequencies which are of interest differ from the prior art because of the presence of the "2" in the exponent of the sample value. From the processing of these signals a display signal is generated which is transmitted to a system display 190 and other information signals are transmitted to the system console 200 associated with the display 190 in accordance with prior art coherent pulse doppler radar systems.

For a signal such as the signal 8' of FIG. 3, this system may be conventional except for the selection of the frequencies sent to the waveform generator so as to comprise subpulse pairs and the multiplication of each $S_H$ by its paired S to recombine the return signals for each subpulse pair into a single signal and the compensation for the doubling of frequency and phase. The IQ detectors 154 may be the same as those used in other coherent pulse doppler radar systems. The bank of analog-to-digital converters 156 is comprised of ADCs which are conventional for IQ detection doppler radar systems.

Figure 7:
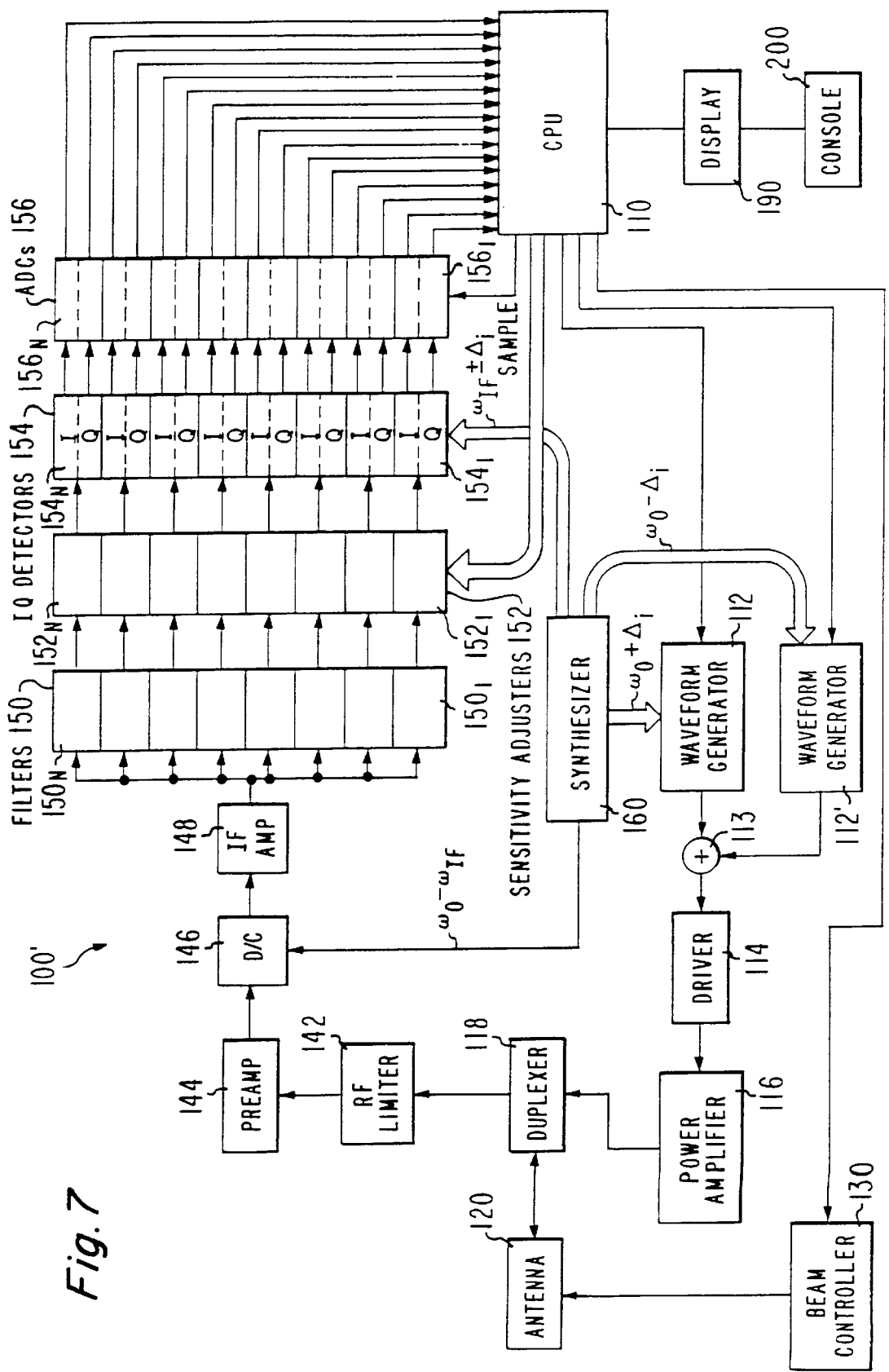
FIG. 7 illustrates in block diagram form a modified version of the FIG. 6 system.

In order to generate the signal 9 of FIG. 5, a waveform generator 112 is needed which is capable of generating two different frequencies simultaneously or else two such waveform generators must be controlled in parallel and their output signals combined prior to their application to the driver amplifier 114. Modification of the system 100 for such use is illustrated in FIG. 7 where system 100' includes a second waveform generator 112' which is provided with the frequencies $\omega_o - \Delta_i$ while the waveform generator 112 is provided with the frequencies $\omega_o + \Delta_i$. The outputs of these waveform generators are combined in a combiner 113 from which they are applied to the driver amplifier 114. The remainder of the system is unchanged with the exception of correcting the time relationship between the signal $S_H$ and the signal $S_L$ within the CPU 110.

This system has the advantage over the prior art of forcing a jammer to spread its power over the full anticipated operating frequency range of the pulse radar in order to be certain of jamming the frequency actually being utilized by the radar. This is because the frequencies are not repeated from pulse to pulse except on a random basis and because each subpulse has a duration which is too short for the jammer to respond to it in time to interfere with the reception of the returned signal at that frequency. It also enables the use of STC to reduce close-in clutter and can eliminate N-time-around range ambiguities.

What is claimed is:

1. In a coherent pulse radar system of the type including means for providing and transmitting a frequency coded transmission pulse and means for receiving and processing return signals coherently in accordance with said transmitted frequency code, the improvement wherein;

said means for providing comprises means for generating a transmission pulse comprised of N pairs of subpulses, N an integer greater than or equal to one, with the first subpulse of the $i^{th}$ pair of subpulses having a sub pulse frequency of $\omega_o + \Delta_i$ and the second subpulse of said $i^{th}$ pair of subpulses having a subpulse frequency of $\omega_o - \Delta_i$, where $\omega_o$ is the carrier frequency, $\Delta_i$ is a frequency offset and i is an integer, $1 \leq i \leq N$, and said means for receiving and processing comprises:
  a separate channel responsive to each subpulse frequency in said transmission pulse for converting the return signal at that sub-pulse frequency to a baseband signal, and
  means for multiplying said baseband signal for said first subpulse of each pair by said baseband signal for said second subpulse of said pair to yield a combined signal for that pair which is free of said frequency offset.

2. The improvement recited in claim 1 wherein:

said means for generating comprises means for providing each of said subpulse pairs in said transmission pulse with a different $\Delta_i$ value, whereby 2N different frequencies are present in said transmission pulse.

3. The improvement recited in claim 1 wherein:
said means for generating comprises means for placing said two subpulses of a pair adjacent in time in said transmission pulse.

4. The improvement recited in claim 1 wherein:
said means for generating comprises means for spacing said two subpulses of a pair in time within said transmission pulse by at least one other subpulse.

5. The improvement recited in claim 1 wherein:
said means for generating comprises means for placing said two subpulses of a pair in an overlapping in-time relationship within said transmission pulse.

6. The improvement recited in claim 1 wherein said means for generating comprises means for changing the carrier frequency $\omega_o$ from one transmission pulse to the next.

7. The improvement recited in claim 1 wherein said means for generating comprises means for changing the frequency offsets $\Delta_i$ from one transmission pulse to the next.

8. The improvement recited in claim 1 wherein said means for generating comprises means for providing a coherent local oscillator signal for each of said subpulse frequencies.

9. The improvement recited in claim 1 wherein said means for receiving and processing comprises means for doppler processing said combined signal.

10. The improvement recited in claim 1 wherein each of said separate channels includes means for applying sensitivity time control to said return signal at its subpulse frequency in times relation to the transmission of said sub-pulse frequency.

11. In a method of processing radar signals including the steps of generating and transmitting a frequency coded transmission pulse, receiving a return signal, coherently detecting said return signal in accordance with said transmitted code, and processing the resulting baseband signals to determine the presence of target returns in the return signal, the improvement wherein:
said generating step comprises generating a frequency code comprising N subpulse pairs, N an integer 1≦N, with one subpulse of the $i^{th}$ pair having a frequency of $\omega_o+\Delta_i$ and the other subpulse of said $i^{th}$ pair having a frequency of $\omega_o-\Delta_i$, where $\omega_o$ is a carrier frequency, $\Delta_i$ is a frequency offset and i is an integer 1≦i≦N; and
the following step is performed after said coherent detecting step and before said processing step:
multiplying the baseband signal detected from said $\omega_o+\Delta_i$ subpulse times the baseband signal detected from said $\omega_o-\Delta_i$ subpulse to produce a combined baseband signal free of said frequency offsets.

12. The improved method recited in claim 11 further comprising the step of:
bringing said $\omega_o+\Delta_i$ baseband signal into time synchronism with said $\omega_o-\Delta_i$ baseband signal prior to performing said multiplying step.

13. The improved method recited in claim 11 wherein said processing step comprises doppler processing said combined signal.

14. The improved method recited in claim 11 wherein:
said generating step comprises generating said $\omega_o+\Delta_i$ and said $\omega_o-\Delta_i$ subpulses sequentially in time.

15. The improved method recited in claim 11 wherein:
said generating step comprises generating said $\omega_o+\Delta_i$ and said $\omega_o-\Delta_i$ subpulses non-sequentially in time with at least one subpulse having a different frequency offset disposed between them in time.

16. The improved method recited in claim 11, wherein said generating step comprises generating said $\omega_o+\Delta_i$ and said $\omega_o-\Delta_i$ subpulses simultaneously.

* * * * *